Patented Mar. 3, 1925.

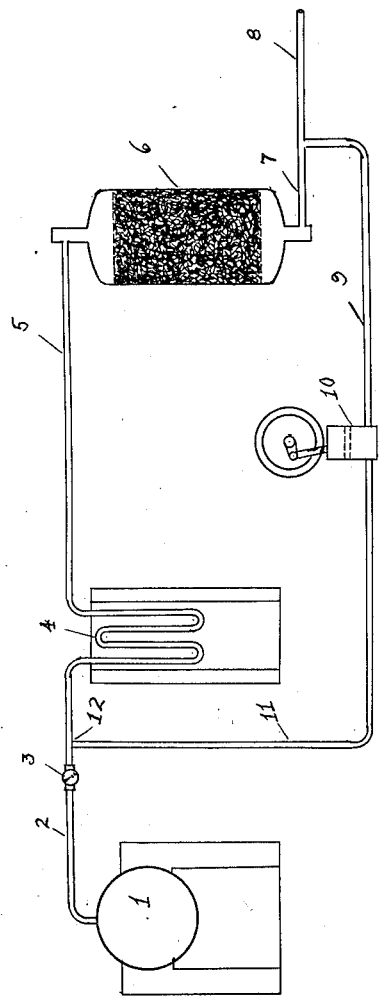

1,528,459

UNITED STATES PATENT OFFICE.

CLYDE L. VORESS, OF RIDGEFIELD PARK, NEW JERSEY, AND VERNON C. CANTER, OF BRADFORD, PENNSYLVANIA, ASSIGNORS TO GASOLINE RECOVERY CORPORATION, A CORPORATION OF DELAWARE.

METHOD OF DISTILLING VAPORS FROM A SOLID ABSORBENT MEDIUM.

Application filed September 2, 1921. Serial No. 497,975.

*To all whom it may concern:*

Be it known that we, CLYDE L. VORESS, and VERNON C. CANTER, citizens of the United States, residing at Ridgefield Park, in the county of Bergen and State of New Jersey, and at Bradford, county of McKean, State of Pennsylvania, respectively, have invented certain new and useful Improvements in Methods of Distilling Vapors from a Solid Absorbent Medium; and we do hereby declare the following to be a full, clear, and exact description of the invention, such as will enable others skilled in the art to which it appertains to make and use the same.

This invention relates to an improved method of distilling and separating absorbed vapors of gasoline, naphtha, kerosene, benzol, toluol, alcohol, ether, acetone, amyl acetate, etc., or any other substances of commercial value amenable to separation by this process from activated charcoal, silica gel or iron gel in which it has been previously absorbed.

It is our intention that the term "absorbed" vapors as here used be applied to any vapors held by the activated charcoal, silica gel or iron gel either by "absorption" or "adsorption" as these terms are now understood.

We have found that it is necessary to supply for the distillation of absorbed vapors from a solid absorbent, heat to raise the temperature of the absorbent to the boiling point of the absorbed liquid, heat to supply the latent heat for the evaporation of the absorbed vapors and a third quantity of heat which we believe to represent the amount of energy necessary to effect the separation of the absorbed vapors from the absorbent. In many cases, especially in the case of activated charcoal, this quantity of heat is practically equal to the latent heat of the absorbed vapors.

The object of the invention is to provide an improved and economical method of applying heat to the absorbed vapors and absorbent to carry out the distillation.

We propose to evaporate such liquids as water, mineral oils or any fractions thereof, alcohol, ether, etc., and supply heat to these vapors until they are in a superheated condition. It is our intention that the term "distilling vapors" used hereinafter, refers to the vapors of such liquids as water, mineral oil or any fractions thereof, alcohol, ether, etc. In most cases, we find that the superheat of these distilling vapors does not need to be more than 20° higher than the highest boiling point attributed to the absorbed vapors but there is no objection to adding superheat until distilling vapors are superheated 200° C. or more above the highest boiling point. Care must be taken with particular distilling vapors to prevent "cracking." With certain substances, such as mineral oils or any fractions thereof, the amount of superheat should not be added higher than the amount absolutely necessary. In certain instances, we have also found that pressures of under two atmospheres would help prevent "cracking." These distilling vapors are then led through the absorbent where they came into intimate contact with the absorbent, giving up their superheat. In the very beginning of the distillation some of the distilling vapors may be condensed giving up not only its superheat but its latent heat also. As more of the superheated distilling vapors are applied, the solid absorbent and the absorbed vapors remaining soon assume the temperature of the boiling point of the heat carrying vapors, at the pressure actually carried. From this time until the end of the distillation the superheat will supply the only heat that can actually be utilized, to furnish heat for the evaporation or energy to break the attraction of the absorbed vapors for the absorbent.

We now propose to take this vapor mixture which contains not only the vapors previously superheated but also an appreciable quantity of the vaporized liquids previously absorbed, and lead them through a compressor back to the inlet of the superheater, where they are again superheated, thus carrying the second charge of superheat to the absorbent vapors. This may be repeated as many times as is necessary to distill off practically all of the absorbed vapors. The process can be carried on continuously in a closed circuit allowing a greater percentage of the absorbed vapors to accumulate in the circulating vapors, as the distillation progresses.

In order that our invention may be clearly understood, we have illustrated in the accompanying diagrammatic drawing, one way in which our process may be carried out.

In the drawing, 1 is a liquid vaporizer in which when heat is applied, vapors are formed which may be passed by the pipe line 2 through the check valve 3 to the superheater 4. The vapors are superheated in the superheater 4 and pass on through the pipe 5 to a container 6 where the absorbent and absorbed substances are held for distillation. The distillation vapors after losing their charge of superheat in the absorbent, pass by pipes 7 and 9 through a vapor forcing device 10 and pipe line 11 back to the point 12 where they again enter line 2. The complete cycle may then be repeated as many times as is necessary to carry sufficient heat into container 6 to complete the distillation. The device 10 may be an ordinary compressor or gas blower or any device suitable for causing a flow of the vapors.

Three variations which we sometimes practice should be noted: One is, to continuously add a small quantity of the original vapors from vaporizer 1 to the line 2 just in advance of the superheater and to continuously draw off a small portion of the vapors, after passing through the absorbent, through the line 8. This permits us to regulate the concentration of the absorbed vapors in the original distilling vapors. Another variation we sometimes practice near the end of the distillation process, is to draw off all the vapors in the system through line 8 and then pass distilling vapors free from the absorbed vapors, directly from the vaporizer 1 through pipe 2, superheater 4, pipe 5, container 6 and pipes 7 and 8. This simply serves to flush out the gases after the circulation of the contaminated gases. A third variation is sometimes made by installing a steam jet at point 3 instead of the positive compressor 10. We are not able to re-circulate as large a portion of the vapors by this method, but it has the advantage of a less costly installation.

One of the principal advantages of our invention is the saving in heat, necessary for the evaporation of the liquids in the evaporator 1. In the case of water at 25 pounds absolute pressure, the latent heat amounts to 952 B. t. u.'s while only about 400 B. t. u.'s are then added for the superheat. It is readily seen that if consecutive charges of superheat could be added to this vapor the large amount of fuel necessary to supply the latent heat will all be saved except that needed before the first charge.

What we claim and desire to secure by Letters Patent is:—

1. A process for distilling completely absorbed vapors from a solid absorbent consisting in passing distilling vapors through the absorbent, and subsequently repassing the same vapors through the absorbent for a sufficient time to vaporize the major portion of the absorbed vapors so that they may be separated and condensed and recovered in liquid form.

2. In a batch process for distilling completely absorbed vapors from a solid absorbent, the steps which consist in passing distilling vapors through said absorbent filled with completely absorbed vapors to cause a portion of the absorbed vapors to be extracted from the absorbent, and subsequently passing the same distilling vapors and vapors which have been extracted from the absorbent through the absorbent as many times as may be necessary to vaporize the major portion of the absorbed vapors, in order that they may be finally drawn from the circuit and condensed and recovered in liquid form.

3. A process for distilling absorbed vapors from a solid absorbent including the steps of passing superheated distilling vapors through the absorbent filled with completely absorbed vapors to extract a portion of the absorbed vapors from the said absorbent, and subsequently superheating the same distilling vapors and the vapors which have been extracted from the absorbent and again passing the distilling vapors and the extracted vapors through the absorbent for a time sufficient to vaporize the major portion of the absorbed vapors held by the absorbent.

4. A process for distilling completely absorbed vapors from a solid absorbent including the steps of superheating distilling vapors, passing said distilling vapors through the absorbent to extract a portion of the absorbed vapors therefrom, subsequently superheating the same distilling vapors and the vapors which have been extracted from the absorbent, passing the distilling vapors and the vapors which have been extracted again through the absorbent, and maintaining the circulation of the distilling vapors and the extracted vapors for a time sufficient to transfer the necessary heat from the source of supply to the absorbent and absorbed vapors for the purpose of separating and vaporizing the major portion of the absorbed vapors.

5. A process of the kind defined in claim 1, in which the distilling vapors are mineral oil vapors.

6. The process of supplying heat to activated charcoal for the purpose of distilling completely absorbed vapors therefrom which consists of distilling vaporizing material containing mineral oil and passing it through a closed circuit wherein it alternately passes through a superheater and is superheated and a condenser containing activated charcoal, together with any absorbed vapors, so as to allow for the utilization of the superheat in heating the charcoal, evaporating the liquid resulting from the absorbent vapors and supplying energy for the separation of the absorbed vapors from the charcoal.

7. The process of supplying heat to activated charcoal for the purpose of distilling therefrom the absorbed vapors which consists of vaporizing material containing mineral oil and passing it through a closed circuit wherein it alternately passes through a superheater and is superheated and a condenser containing the activated charcoal, together with any absorbed vapors, so as to allow for the utilization of the superheat in heating the charcoal, evaporating the liquid resulting from absorbed vapors, and supplying energy for the separation of the absorbed vapors from the charcoal, together with the subsequent step of passing a portion of all of the vapors through a water cooled condenser.

8. A method of absorbing and distilling vapors, consisting in contacting a gas carrying vapors with a solid absorbent and continuing the contacting action until the absorbent is substantially impregnated with the vapors, then distilling the absorbed vapors from the absorbent by passing distilling vapors through the absorbent, and subsequently re-passing the same distilling vapors through the absorbent for a sufficient time to vaporize the major portion of the absorbed vapors so that they may be separated, condensed and recovered in liquid form.

9. In a process of isolating or concentrating special constituents of mixtures of gases or vapors by adsorption in which the absorbed gas constituents are expelled and recovered by heat, the step which consists in passing through the charged adsorbent hot gas which has a higher concentration in the adsorbed constituents than the mixture under treatment.

In testimony whereof we affix our signatures.

CLYDE L. VORESS.
VERNON C. CANTER.